United States Patent [19]
Srivastava

[11] 3,737,808
[45] June 5, 1973

[54] PULSE SHAPING NETWORK

[75] Inventor: Keshava Srivastava, Oklahoma City, Okla.

[73] Assignee: Honeywell Information Systems Inc., Waltham, Mass.

[22] Filed: Dec. 29, 1971

[21] Appl. No.: 214,501

[52] U.S. Cl. .................333/20, 333/28 R, 333/31 R, 333/70 T
[51] Int. Cl. .........H03h 7/28, H03h 7/30, H04b 3/04
[58] Field of Search ........................333/70 T, 20, 28, 333/18, 31 R

[56] References Cited
UNITED STATES PATENTS

| | | | |
|---|---|---|---|
| 3,315,171 | 4/1967 | Becker | 333/28 X |
| 3,292,110 | 12/1966 | Becket et al. | 333/18 |
| 3,381,245 | 4/1968 | Guanella | 333/20 |
| 3,305,798 | 2/1967 | Rappeport | 333/28 X |
| 2,922,965 | 1/1960 | Harrison | 333/28 R |
| 3,252,093 | 5/1966 | Lerner | 333/20 X |

*Primary Examiner*—Rudolph V. Rolinec
*Assistant Examiner*—Marvin Nussbaum
*Attorney*—Lewis P. Elbinger, Ronald T. Reiling and Fred Jacob

[57] ABSTRACT

An electrical network for reducing the effective duration of a pulse by increasing the peak amplitude of the pulse within a predetermined portion of its defining bit period relative to the maximum amplitude of such pulse within a predetermined portion of an adjacent bit period, wherein a signal representation of such pulse, an inverter advanced signal representing such pulse, and an inverted retarded signal representing such pulse are combined to generate a combination pulses of reduced effective duration.

11 Claims, 5 Drawing Figures

PULSE SHAPING NETWORK

BACKGROUND OF THE INVENTION

This invention relates to pulse shaping networks, and more particularly to filters for narrowing, or reducing the effective duration, of electrical pulses.

In the extraction of the information carried by electrical signal trains, it is well-known that the maximum amount of accurate information can be extracted from such train, or a given amount of information can be more easily and economically extracted, if the signal-to-noise ratio of the train is maximized. Accordingly, in signal train generating and receiving apparatus attention is directed to equipment maximizing the signal-to-noise ratio prior to the attempt to extract the information from the train. Such equipment is usually intended to maximize the ratio of the peak amplitude of the information signals relative to the amplitude of the noise signals.

A widely spread technique for communicating information today represents information in the form of electrical pulses. A pulse has a definable width or time interval of occurrence, and most of the energy of the pulse is concentrated within such time interval. For purposes of the ensuing description, the definite interval within which a pulse is intended to occur, and only within which the energy of such pulse will be considered as representing information will be termed the "pulse defining" period.

In one form of pulse-represented information system, the information-bearing parts of a signal train comprise a succession of information intervals of uniform duration, each such information interval containing a binary digit. The binary digit in an information interval is a binary 1 or a binary 0 according to whether or not a pulse is present in the information interval. In this information system, a binary digit is termed a "bit" and an information interval may be termed a "bit period."

In generating binary digital information for such a system, a bit representing pulse may not be confined within a single bit period, but may extend over its defining period and one or more adjacent preceding and following bit periods. Bit representing pulses of this type are often generated in magnetic tape or disc information stores, for example, in those magnetic stores, the bit pulses are generated by a magnetic sensing transducer which responds to the rate of change of magnetic field as the magnetic information bearing medium is moving past the transducer.

In extracting information from an information signal train of the type in which each of a succession of uniform duration bit periods contains either a binary 1 represented by a pulse, or a binary 0 represented by the absence of a pulse, the signal train is sampled during each bit period, or during a predetermined portion of each bit period near the center thereof, to determine whether or not a pulse is present in the bit period. Whether a pulse is positively, accurately, and easily recognized within each bit period in which a binary 1 is to be represented and whether the absence of a pulse is positively, accurately, and easily recognized within each bit period in which a binary 0 is to be represented depends on the signal-to-noise ratio of the signal train. Thus, the greater the amplitude of the pulses within the pulse defining periods relative to the amplitude of the noise within the periods in which pulses are not intended to be recognized, the easier and more accurate is the extraction of the binary digital information from the signal train.

It is apparent that any portion of a pulse which extends beyond its defining bit period contributes to the noise content in the periods adjacent to its defining bit period. Such extending pulse portions reduce the ratio of the peak amplitude of the pulse in its pulse defining period relative to the peak amplitude of the combined extraneous pulse and noise signals in adjacent bit periods. Accordingly, to enhance the signal-to-noise ratio of a binary pulse signal train of this type, the energy of each pulse should be confined to the extent feasible to its defining period.

Various techniques have been described in the prior art for recognizing pulses in the presence of noise. Thus, M. Schwartz in "Information Transmission Modulation and Noise," 1959, by McGraw-Hill Book Company, Inc. describes many complex mathematically derived filters of general applicability for recognizing pulses in the presence of common noise. In addition, many forms of electronic circuits have been disclosed for retiming, reshaping and regenerating pulses in order to provide for their conformance with predetermined shape and width specifications. Circuits of this type are described, for example, by R. S. Ledley in "Digital Computer and Control Engineering," 1960, McGraw-Hill Book Company, Inc. However, none of these prior art techniques and circuits have been directed to the particular problems of providing a pulse shaping network for reducing by a predetermined amount the amplitude of a pulse outside of its pulse defining bit period, or of narrowing a pulse by maximizing the ratio of peak amplitude of the pulse within a predetermined portion of its defining bit period relative to the amplitude of the portion of such pulse extending into a predetermined portion of an adjacent bit period. Thus, none of these prior art techniques and circuits have been directed to a precisely designed network which maximizes the signal-to-noise ratio of a pulse train in which the noise comprises portions of the information pulses.

Accordingly, it is the principal object of this invention to provide an improved network for increasing the signal-to-noise ratio of signal trains in which information is represented by electrical pulses.

Another object of this invention is to provide a network for narrowing, of reducing the effective duration, or pulses.

Another object of the invention is to provide apparatus for shaping an electrical pulse within a predetermined one of a succession of intervals of uniform duration.

Another object of this invention is to provide apparatus for changing the shape of a pulse existing over a pulse defining bit period and one or more adjacent preceding and following bit periods.

SUMMARY OF THE INVENTION

In accordance with the present invention apparatus is provided for narrowing a pulse by increasing the peak amplitude of the pulse within a predetermined portion of its defining bit period relative to the maximum amplitude of such pulse within a predetermined portion of an adjacent bit period. Such apparatus supplies a first signal corresponding to the pulse to be shaped. A delay element supplies a second signal corresponding to the pulse to be shaped and delayed therefrom by a first delay amount, which may be one-half of a bit period. Another delay element supplies a third signal corresponding to the pulse to be shaped and delayed therefrom by a second delay amount, which may also be one-half of a bit period. A ratio determining means adjusts the amplitudes of the first and third signals relative to the amplitude of the second signal to represent a first ratio. The first, second and third signals, with their relative amplitudes so adjusted are applied to respective first, second and third input terminals of a signal combining means, which may be an algebraic adder. The combining means combines the three signals received thereby according to the predetermined operation which it is to perform, such as algebraic addition, and delivers a corresponding output signal, which is the desired narrowed pulse. The ratio determining means is designed to have the first ratio provide a maximum second ratio between the peak amplitude of the output pulse within a predetermined portion of its pulse defining bit period and the maximum amplitude of such output pulse within a predetermined portion of a bit period adjacent to the pulse defining period. Accordingly, an output pulse is generated whose energy is more nearly confined to its pulse defining bit period and which contributes minimally to the noise in bit periods adjacent to the pulse defining period.

BRIEF DESCRIPTION OF THE DRAWINGS

The invention will be described with reference to the accompanying drawings, wherein.

DESCRIPTION OF THE PREFERRED EMBODIMENT

Figure 1:
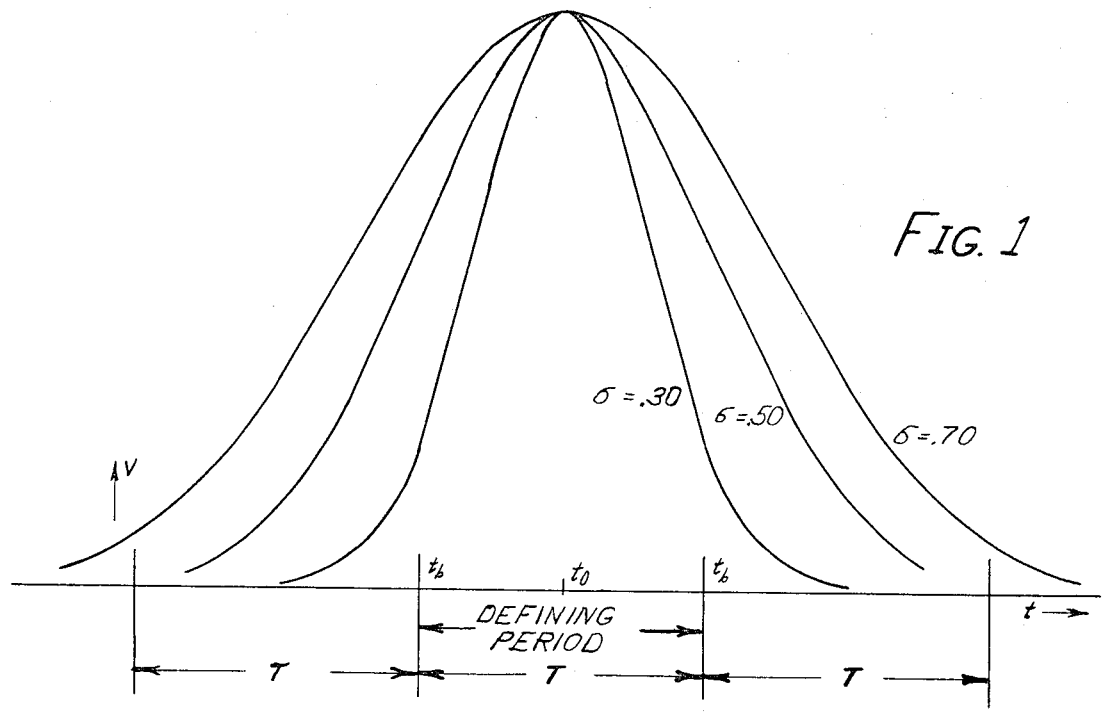
FIG. 1 illustrates three representative pulses of different widths relative to their defining periods.

The present invention is intended to reduce the effective duration of pulses primarily of the general form shown in FIG. 1. Wen the frequency content of a rectangular electrical pulse is limited, such as by attenuating or inhibiting the higher harmonic frequency components of the pulse, the consequent spectral limited pulse takes on the shape of the pulses of FIG. 1, exhibiting rounded corners and acquiring "skirts" which increase its effective duration. Pulses of this form are also generated by a magnetic sensing transducer which senses the rate of change of magnetic fields representing stored binary digits as a magnetic information-bearing medium is moved past the transducer. The pulses delivered by the transducer depart from the precise rectangular shape due to the fringing of the magnetic fields defining the stored bits and because of the limited frequency response to the transformer itself.

FIG. 1 illustrates how the different pulses shown extend beyond their respective defining bit periods into adjacent bit periods, thereby contributing in varying degrees to the noise content in such adjacent bit periods. The type of pulse shown in FIG. 1 is known as a gaussian pulse, which is a pulse whose amplitude versus time configuration conforms to a well-known equation that defines two-dimensional symmetrical curves known as "gaussian" curves. Thus, the symmetrical gaussian pulse has been selected as the vehicle for describing the operation and defining the design of the network of the present invention because it closely approximates the symmetrical pulse which the network of the invention is intended to narrow. Moreover, the mathematically described gaussian pulse permits a complete and precise mathematical analysis of the design and characteristics of the network with which it is employed. However, the present invention is not limited to narrowing only gaussian type pulses, but may, instead, be employed with most types of electrical pulses which are required to be narrowed.

Assuming that the pulse to be narrowed by the present invention can be characterized by its voltage as a function of time, the corresponding symmetrical gaussian pulse can be represented by the equation:

$$V = Ae - \left(\frac{t-t_0}{T}\right)^2 / 2\sigma^2$$

wherein:

$A$ is the peak voltage of the pulse, $T$ is the duration of the bit periods of the signal train in which the pulse occurs, $t_0$ represents the time of occurrence of the axis of symmetry of the symmetrical pulse, and $\sigma$ is a factor which determines the relative width of the pulse, and, therefore, will be termed hereinafter the "width factor."

The three pulses shown in FIG. 1 are gaussian pulses for which the width factors are respectively 0.30, 0.50 and 0.70. FIG. 1 demonstrates that an increased width factor corresponds to a wider pulse. Thus, the pulse whose width factor is 0.30 extends only a small amount beyond its defining bit period. On the other hand, the pulses whose width factors are 0.50 and 0.70 extend substantially into and across the bit periods adjacent to the defining bit period.

As explained previously herein, a signal-to-noise ratio for a pulse of the type shown in FIG. 1 may be expressed in which the noise comprises the portions of the pulse which extend beyond its defining period. Accordingly, if the full duration of the bit periods are considered, the signal-to-noise ratio of one of these pulses, considering only the noise contribution of the pulse in the bit period adjacent the defining bit period, is the ratio of the maximum voltage, or amplitude, of the pulse within the defining bit period to the maximum voltage, or amplitude, of the pulse in the adjacent period. This latter value is the voltage of the pulse in the immediate vicinity of the boundary between the defining bit period and the adjacent bit period, designated as $t_b$ in FIG. 1. For the pulse whose width factor is 0.30 this signal-to-noise ratio is 4.00, for the pulse whose width factor is 0.50 this signal-to-noise ratio is 1.65, and for the pulse whose width factor is 0.70 this signal-to-noise ratio is 1.29.

Figure 2:
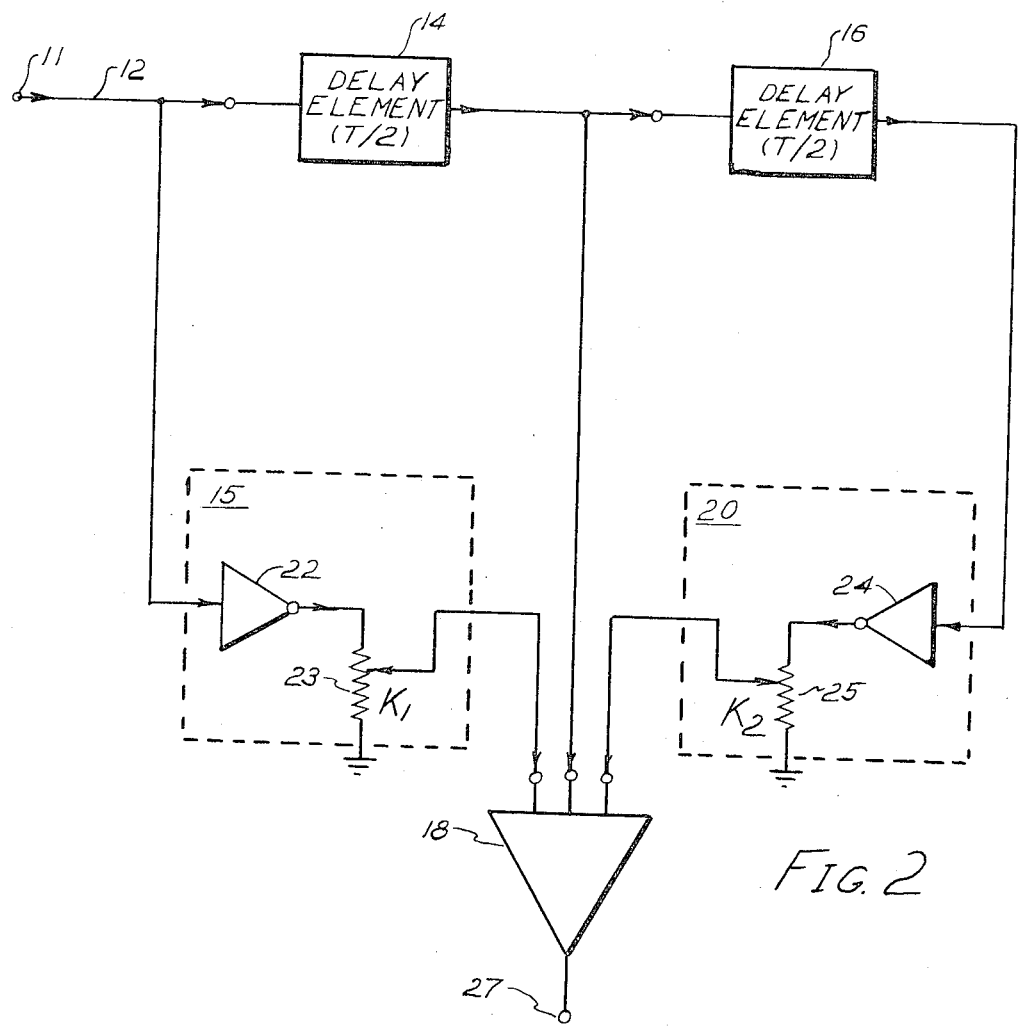
FIG. 2 is a block diagram of the preferred embodiment of the pulse shaping network of the invention.

The pulse shaping network shown in FIG. 2, is intended to reduce the effective duration of pulses which extend beyond the pulse defining bit periods, thereby improving their signal-to-noise ratio. This network is particularly adapted to the narrowing of pulses primarily of the general form shown in FIG. 1. The network provides for the generation of three separate signals, each of which corresponds to an input pulse to be narrowed, establishes a predetermined amplitude and polarity relationship between the three signals, and combines the three signals according to an arithmetic operation to achieve a desired configuration of output pulses which is a narrowed version of the input pulse.

The network shown in FIG. 2 employs one form of transversal filter, described as capable of performing certain types of pulse shaping, shown by R. W. Lucky et al. in "Principles of Data Communications," 1968 by McGraw-Hill Book Company, Inc.

The pulse shaping network of FIG. 2 comprises an input terminal 11 for receiving the input pulse to be narrowed. A network input lead 12 is connected to terminal 11 and transmits the input pulse to a first delay element 14 and a first attenuator inverter 15. Delay element 14 is provided with an input lead which is connected to input lead 12 for receiving the input pulse and an output lead which is connected to transmit the delayed output pulse delivered by delay element 14 to a second delay element 16 and a summing circuit 18. Delay element 16 is provided with an input lead which is connected to the output lead of delay element 14 for receiving the delayed output pulse transmitted by delay element 14. Delay element 16 is also provided with an output lead which is connected to transmit the delayed output pulse delivered by delay element 14 to a second attenuator inverter 20. Each of delay elements 14 and 16 provides a delay of one-half bit period for pulses transmitted therethrough.

Attenuator inverters 15 and 20 invert the polarity of the respective pulses received thereby and reduce, or attenuate, the amplitude of the received pulses by respective predetermined amounts. The output signals delivered by attenuator inverters 15 and 20 are applied to respective input leads of summing circuit 18. The amount of attenuation provided by each of attenuator inverters 15 and 20 in the embodiment of FIG. 2 is that which provides respective predetermined ratio $K_1$ and $K_2$, which are less then unity, between the amplitude of respective output pulses delivered by the attenuator inverter and the amplitude of the respective input pulse received by the attenuator inverter. The ratios $K_1$ and $K_2$ will hereinafter be termed "attenuation factors." Attenuator inverters 15 and 20 may take any one of several forms known in the art for producing the requisite function. An exemplary form is shown in FIG. 2, wherein attenuator inverter 15 comprises an inverting amplifier 22 connected to a potentiometer 23. The polarity of the input pulse received by attenuator inverter 15 is inverted by inverting amplifier 22 and the consequent inverter polarity pulse is attenuated by potentiometer 23. The setting of the movable arm of potentiometer 23 determines the attenuation factor $K_1$ provided by attenuator inverter 15. Similarly, attenuator inverter 20 comprises an inverting amplifier 24 connected to a potentiometer 25. The setting of the movable arm of potentiometer 25 determines the attenuation factor $K_2$ provided by attenuator inverter 20. The inverted and attenuated pulses delivered by attenuator inverters 15 and 20 are applied to respective input terminals of summing circuit 18.

Summing circuit 18 is a device adapted to receive three input signals at the respective three input terminals thereof and to deliver an output signal at the output terminal 27 thereof which represents the algebraic sum of the values represented by the three input signals. The output signal delivered at terminal 27 is a pulse which is a narrowed version of the input pulse received at input terminal 11 of the network.

The values of the attenuation factors $K_1$ and $K_2$ are adjusted by the respective potentiometers 23 and 25 to provide a maximum ratio between the peak amplitude of the output pulse delivered at terminal 27 and the maximum amplitude of such output pulse during predetermined portions of bit periods adjacent to the defining bit period of such pulse. In determining the values of attenuation factors $K_1$ and $K_2$, the entire durations of the defining and adjacent bit periods may be employed in analyzing the amplitudes of the pulse involved, or only predetermined portions of each of these bit periods may be employed.

The ensuing description will be directed toward an explanation of how the attenuation factors $K_1$ and $K_2$ are determined and their effect on the consequent output pulse. However, in the disclosed embodiment attenuation factors $K_1$ and $K_2$ will be maintained equal and both are designated as attenuation factor K hereinafter.

The pulse shaping network of the invention operates, generally, by subtracting from the input pulse, as represented by the signal applied to the second input terminal of summing circuit 18 from delay element 14, a signal which reduces the skirt of the leading edge of the input pulse, which is that portion of the pulse occurring prior to its defining period, and a signal which reduces the skirt of the trailing edge of the input pulse, which is that portion of the pulse occurring following its defining period. The signal which reduces the skirt of the leading edge of the input pulse is primarily the attenuated inverted representation of the input pulse applied to the first input terminal of summing circuit 18 from attenuator inverter 15. The peak of this signal is advanced by one-half bit period relative to the time of occurrence of the peak of the pulse applied to the second input terminal of summing circuit 18. The signal which reduces the skirt of the trailing edge of the input pulse is primarily the attenuated inverted representation of the input pulse applied to the third input terminal of summing circuit 18 from attenuator inverter 20. The peak of this latter signal is retarded by one-half bit period relative to the time of occurrence of the peak of the pulse applied to the second input terminal of summing circuit 18.

These advanced and retarded signal representations of the input pulse are subtracted from the actual signal representation of the input pulse by the algebraic addition operation provided on these three signals by summing circuit 18. Thus, the leading and trailing skirts of the input pulse are reduced in accordance with the amplitudes of these advanced and retarded signals. The ratio between the amplitudes of the advanced and retarded pulse representations on one hand and the input pulse representation on the other hand is determined by the common attenuation factor K, controlled by the similar settings of potentiometers 23 and 25.

Figure 3:
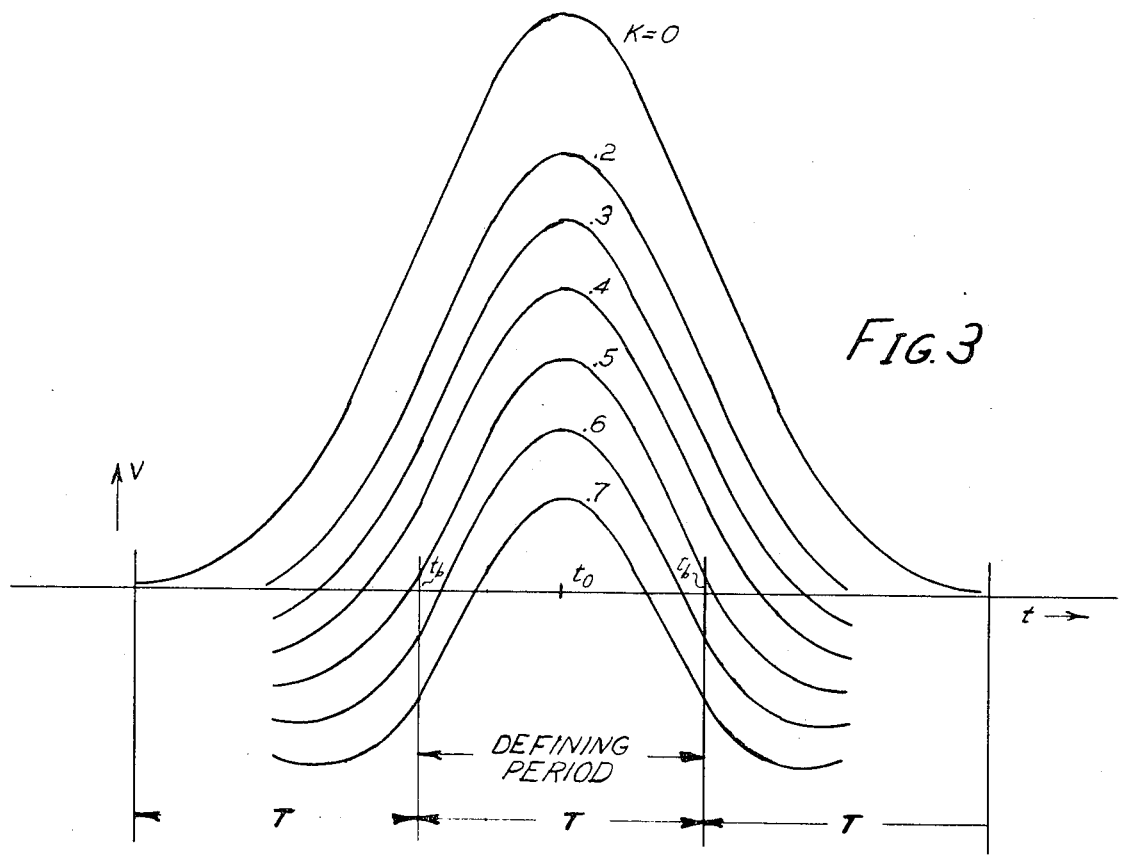
FIG. 3 illustrates different output pulses delivered by the network of FIG. 2 for different values of the network attenuation factor K in response to a particular input pulse.

By way of example FIG. 3 illustrates different-shaped output pulses delivered by summing circuit 18 for various values of attenuation factor K when the network receives an input pulse whose width factor is 0.50, which is the pulse for which K = 0. FIG. 3 illustrates that the instant invention reduces the relative amplitudes of the skirts of the input pulse as the attenuation factor K is increased. Thus, whereas the ratio of the peak amplitude of the input pulse to the amplitude of such pulse at the boundaries of the defining period is approximately 1.65 which is the aforementioned signal-to-noise ratio for the input pulse, this ratio is increased in the output pulse to approximately 2.00 for K = 0.20, 2.46 for K = 0.30, 3.46 for K = 0.40 and 3.90 for K = 0.42. However, for values of K greater than 0.42, the maximum amplitude of the output pulse in the adjacent bit period no longer occurs at the boundary $t_b$, whereupon using this boundary value to represent the signal-to-noise ratio becomes meaningless. Moreover, for values of K greater than 0.42, the ratio of the peak amplitude of the output pulse in the defining period to the maximum amplitude of the output pulse in the adjacent periods commences to decrease.

Accordingly, the attenuation factor K reaches a value, termed its optimal value, for which the ratio between the peak amplitude of the output pulse in the defining period to the maximum amplitude of the output pulse in the adjacent periods is maximum. This optimal value of K, for a particular input pulse, thereby provides a maximum signal-to-noise ratio for the corresponding output pulse if the full durations of the defining and adjacent bit periods are considered. For an input pulse whose width factor is 0.50, such optimal value of attenuation factor K is 0.42. The corresponding maximum signal-to-noise ratio for the output pulse is approximately 3.90.

Figure 4:
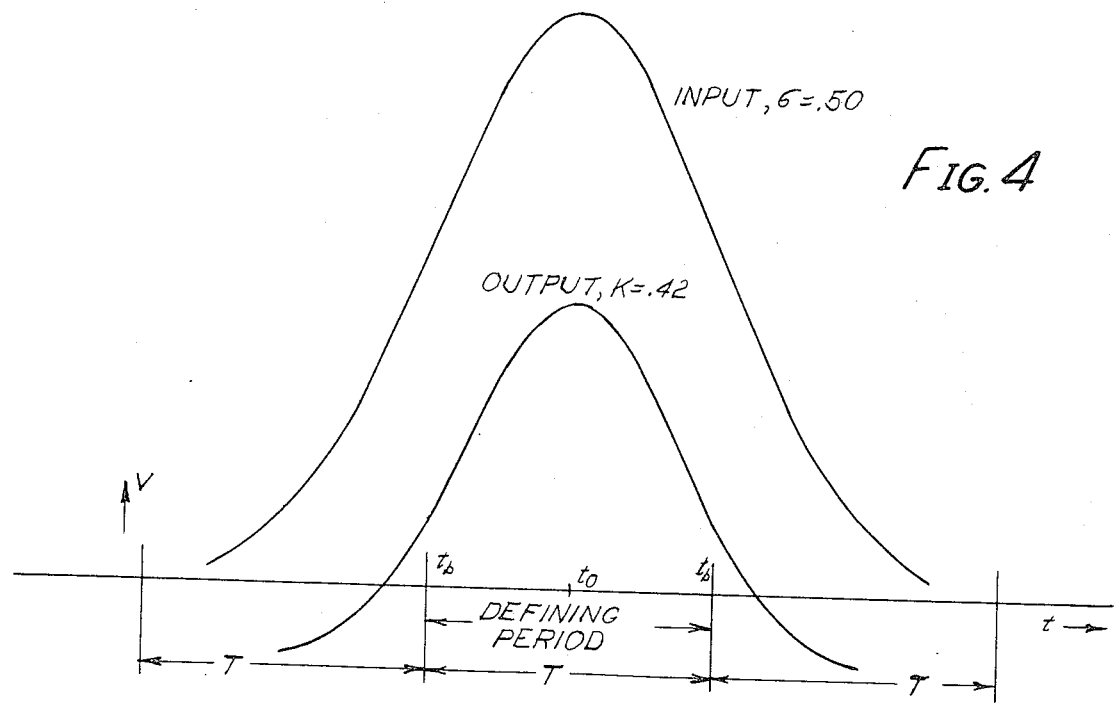
FIG. 4 illustrates for comparison a particular input pulse applied to the network of FIG. 2 and the corresponding output pulse delivered by the network for the optimal value of attenuation factor K; and, FIG. 5 illustrates a pair of curves representing respectively the variation of the optimal attenuation factor K and the corresponding signal-to-noise ratio achieved in the output pulses delivered by the network of FIG. 2 for different values of the width factor $\sigma$.

FIG. 4 affords a comparison of the input and output pulses of a network of the type shown in FIG. 2, in which the attenuation factor K is set to the optimal value 0.42 for an input pulse whose width facto $\sigma$ is 0.50. The significant reduction in the skirts from the input pulse to the output pulse is demonstrated by this figure. This reduction in the skirts of the pulse affords an improvement in signal-to-noise ratio, from 1.65 for the input pulse to approximately 3.90 for the output pulse, considering the full duration of the defining and adjacent bit periods.

Figure 5:
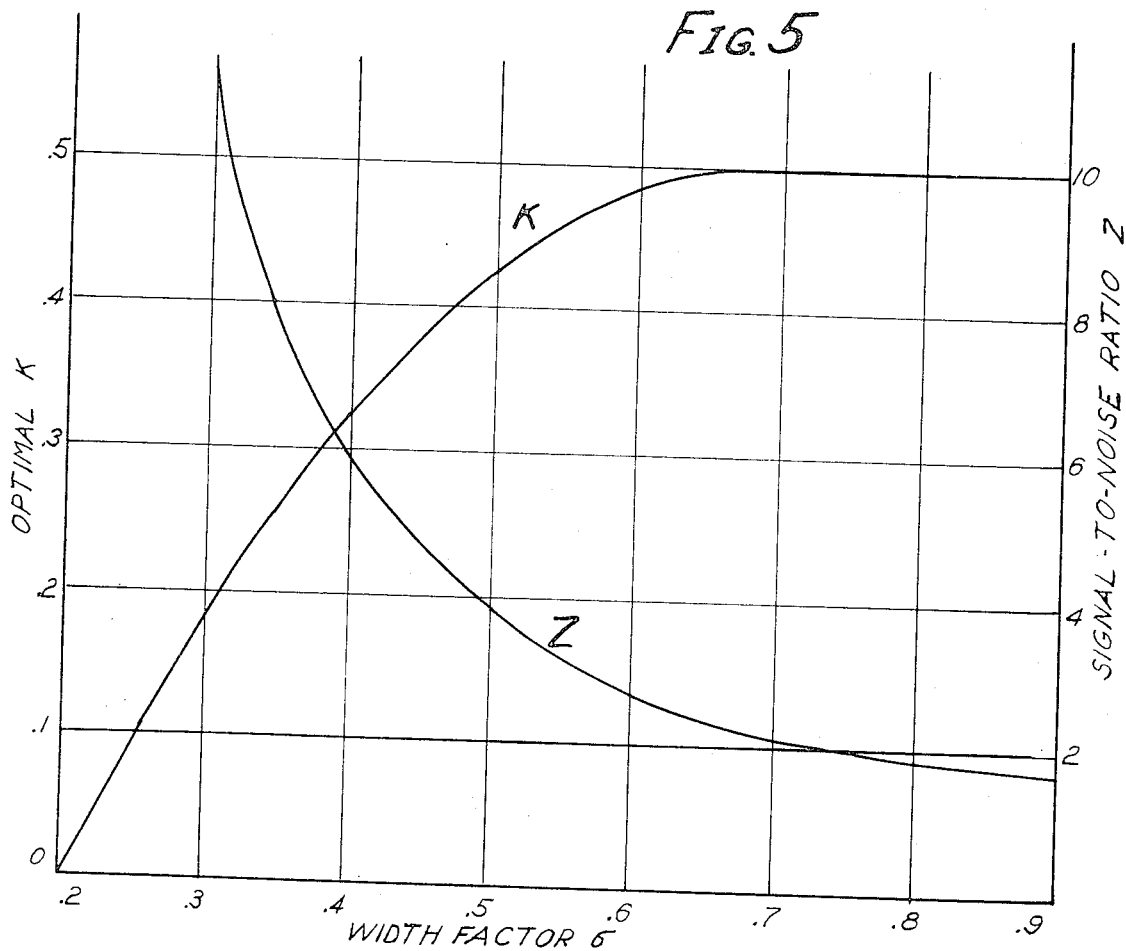

The optimal value of attenuation factor K for achieving maximum signal-to-noise ratio for the output pulse varies according to the width factor $\sigma$ of the input pulse. This variation of the optimal value of attenuation factor K for input pulses of different width factors is shown by the curve labeled "K" in FIG. 5. This figure also illustrates, by the curve designated "Z," the maximum signal-to-noise ratio achievable in the output pulse, considering the full duration of the defining and adjacent bit periods, for the corresponding optimal values of attenuation factor K.

As has been mentioned previously herein, a signal train may be sampled for its information content only during predetermined portions of each bit period, preferably portions which are centered about the center of each bit period. The instant invention is also applicable to increasing the signal-to-noise ratio of pulses utilized in such systems. In such event, the pulse portion representing noise in the signal-to-noise ratio of a pulse is not determined by the maximum amplitude of the pulse considered across the entire adjacent bit period, but by only the maximum amplitude of the pulse in the sampling portion of the adjacent bit period. It is apparent from FIG. 1 that the signal-to-noise ratio of an input pulse is greater when the amplitude of such pulse is considered only near the center of the adjacent bit period, rather than over the entire adjacent bit period. Therefore, because the amplitude of the pulse at the adjacent bit period boundary does not contribute to the noise, the optimal values of K will differ for a gaussian pulse of predetermined width factor $\sigma$. Here, the optimal value of K is that which maximizes the ratio of the peak amplitude of the output pulse in its defining period to the maximum amplitude of the output pulse in the sampling portion of the adjacent bit period.

In determining the values of attenuation factor K to employ for the network of this invention computer analysis, manual mathematical analysis, or graphical combination of curves representing pulses may be employed. All of these techniques are well known in the art. Although particular values of the delay provided by delay elements 14 and 16 have been specified in the illustrated embodiment, it is within the scope of this invention to provide other and different values for both such elements where an input pulse is not representable by the gaussian form, or is unsymmetrical, the above-described analytical technique may be employed to determine these values for optimum signal-to-noise ratio improvement.

Thus, there has been described herein a novel and improved network for reducing the effective duration of electrical pulses by confining the energy of such pulses more nearly to their pulse defining period. The pulses delivered by the network of the invention exhibit a substantially increased signal-to-noise ratio over the received pulses.

While the principles of the invention have now been made clear in illustrative embodiment, there will be immediately obvious to those skilled in the art many modifications in structure, arrangements, proportions, the elements, materials, and components used in the practice of the invention, and otherwise, which are particularly adapted for specific environments and operating requirements, without departing from these principles. The appended claims are therefore intended to cover and embrace any such modification, within the limits only of the true spirit and scope of the invention.

What is claimed is:

1. Apparatus for shaping an electrical pulse within one of a succession of intervals of uniform duration and which extends beyond said one interval so as to contribute to the noise content in an adjacent interval, comprising means responsive to said pulse for supplying a first signal corresponding to said pulse;

means responsive to said pulse for supplying a second signal corresponding to said pulse and delayed therefrom by a first delay amount;

means responsive to said pulse for supplying a third signal corresponding to said pulse and delayed therefrom by a second delay amount;

ratio determining means responsive to at least one of said first, second and third signals for providing that the amplitudes of said first and third signals relative to the amplitude of said second signal represent a first ratio;

combining means having first, second and third input terminals for receiving respective input signals and an output terminal, said combining means performing a predetermined combinatorial operation on the signals received at said input terminals and delivering an output signal at said output terminal representing the result of said combinatorial operation; and means for coupling said first, second and third signals respectively to said first, second and third input terminals;

said ratio determining means designed to have said first ratio provide a maximum second ratio between the maximum amplitude of said output signal within a predetermined portion of said one interval and the maximum amplitude of said output signal during a predetermined portion of another of said intervals adjacent to said one interval so as to confine said output signal to said one interval.

2. The apparatus of claim 1, wherein said first delay amount is equal to one-half the duration of one of said intervals and said second delay amount is equal to the full duration of one of said intervals.

3. The apparatus of claim 2, wherein said combinatorial operation performed by said combining means on said first, second and third signals is an algebraic addition operation.

4. The apparatus of claim 3, wherein said first and third signals are of opposite polarity to said second signal.

5. The apparatus of claim 4, wherein said predetermined portion of said one interval comprises the entirety of said one interval and said predetermined portion of said adjacent interval comprises the entirety of said adjacent interval.

6. The apparatus of claim 4, wherein said first ratio is determined for a gaussian pulse closely approximating said electrical pulse and said maximum second ratio is determined for said output signal as delivered in response to first, second and third signals which correspond to said gaussian pulse.

7. A pulse shaping network for changing the shape of an electrical pulse occurring over at least consecutive first and second intervals, one of said intervals corresponding to a defining interval for said pulse, comprising:

a network input lead for receiving said pulse;

first and second delay elements, each of said delay elements having respective input and output leads, the input lead of said first delay element being connected to said network input lead and the output lead of said first delay element being connected to the input lead of said second delay element;

a first attenuator inverter, said first inverter having an input lead for receiving an input signal and an output lead for delivering an output signal, the amplitude of the output signal delivered by said first inverter representing a first ratio relative to the amplitude of the input signal received thereby, said ratio being less than unity, and the polarity of the output signal delivered by said first inverter being opposite to the polarity of the input signal received thereby, the input lead of said first inverter being coupled to the input lead of said first delay element;

a second attenuator inverter, said second inverter having an input lead for receiving an input signal and an output lead for delivering an output signal, the amplitude of the signal delivered by said second inverter representing a second ratio relative to the amplitude of the input signal received thereby, said second ratio being less than unity, and the polarity of the output signal delivered by such second inverter being opposite to the polarity of the input signal received thereby, the input lead of said second inverter being coupled to the output lead of said second delay element;

a summing means having first, second and third input terminals for receiving respective input signals and an output terminal, said summing means performing an algebraic addition operation on the signals received at said input terminals and delivering an output signal at said output terminal representing the algebraic sum of the values represented by the three input signals received at said input terminals; and means for coupling the first input terminal of said summing means to the output lead of said first inverter, for coupling the second input terminal of said summing means to the output lead of said first delay element, and for coupling the third input terminal of said summing means to the output lead of said second inverter;

said first and second ratios being selected to provide a maximum third ratio between the maximum amplitude of said summing means output signal within a predetermined portion of said second interval and the maximum amplitude of said summing means output signal during a predetermined portion of said first interval whereby said output signal is confined to said defining interval.

8. The network of claim 7, wherein the amount of delay provided by each of said first and second delay elements is equal to one-half the duration of said second interval.

9. The network of claim 8, wherein said predetermined portion of said first interval comprises the entirety of said first interval and said predetermined portion of said second interval comprises the entirety of said second interval.

10. The network of claim 9, wherein said first and second ratios are equal and are determined for a gaussian pulse closely approximating said electrical pulse and said maximum third ratio is determined for said output signal of said summing means as delivered in response to the application of said gaussian pulse to said network input lead.

11. The network of claim 8, wherein said first and second ratios are determined for a gaussian pulse closely approximating said electrical pulse and said maximum third ratio is determined for said output signal as delivered by said summing means in response to the application of said gaussian pulse to said network input lead.

* * * * *